United States Patent [19]
Oshima

[11] 4,394,891
[45] Jul. 26, 1983

[54] DISC BRAKE

[75] Inventor: Harumi Oshima, Kawasaki, Japan

[73] Assignee: Tokico Ltd., Kawasaki, Japan

[21] Appl. No.: 224,486

[22] Filed: Jan. 12, 1981

[30] Foreign Application Priority Data

Jan. 19, 1980 [JP] Japan .................................. 55-5018
Mar. 11, 1980 [JP] Japan ........................... 55-31672[U]

[51] Int. Cl.³ ............................................. F16D 65/02
[52] U.S. Cl. .................................................. 188/73.38
[58] Field of Search ................. 188/73.1, 73.33, 73.34, 188/73.35, 73.36, 73.37, 73.38, 73.43, 73.44, 73.45, 72.4

[56] References Cited

U.S. PATENT DOCUMENTS

| | | | |
|---|---|---|---|
| 3,710,896 | 1/1973 | Machek | 188/73.36 |
| 4,061,209 | 12/1977 | Gee et al. | 188/73.36 |
| 4,136,761 | 1/1979 | Burgdorf et al. | 188/73.36 |
| 4,220,223 | 9/1980 | Rinker et al. | 188/73.1 |
| 4,290,508 | 9/1981 | Baum | 188/73.38 |

FOREIGN PATENT DOCUMENTS 2514385 10/1975 Fed. Rep. of Germany ... 188/73.45

*Primary Examiner*—Duane A. Reger
*Attorney, Agent, or Firm*—Fleit, Jacobson & Cohn

[57] ABSTRACT

A disc brake including a carrier adapted to be secured to a non-rotatable part of a vehicle and having two circumferentially spaced arm portions which straddle respectively the outer circumference of a rotatable disc, a pair of friction pads supported on the arm portions of the carrier to slide in the direction of the axis of the disc, a caliper mounted on the carrier to slide in the direction of the axis of the disc and having a limb portion straddling the outer circumference of the disc, and a brake actuator incorporated in the caliper for pressing one of friction pads against one surface of the disc, whereby the reaction force of the brake actuator displaces the caliper with respect to the carrier to transmit the brake applying force to the other friction pad through the limb portion of the caliper. A pad spring formed by bending a rod member is retained on the caliper to bias the friction pads in the radially inward direction with respect to the disc.

4 Claims, 26 Drawing Figures

DISC BRAKE

BACKGROUND OF THE INVENTION

This invention relates to disc brakes and, particularly to disc brakes of the kind including a carrier adapted to be secured to a non-rotatable part of a vehicle and having two circumferentially spaced arm portions which straddle respectively the outer circumference of a rotatable disc, a pair of friction pads disposed on opposite sides of the disc and being supported on the arm portions of the carrier to slide in the direction of the axis of the disc, a caliper mounted on the carrier to slide in the direction of the axis of the disc and straddling the outer circumference of the disc, and a brake actuator incorporated in the caliper for applying one friction pad against one surface of the disc. The reaction force of the brake actuator displaces the caliper on the carrier to apply the other friction pad against the other surface of the disc. The braking torque generating in the friction pads may directly received by the arm portions of the carrier.

Usually, one or two pad springs formed of a sheet metal are mounted between the carrier, the caliper and the friction pads to bias the caliper radially outwards and friction pads radially inwards with respect to the axis of the disc so as to take up the manufacturing tolerance, to prevent vibrations of the caliper and of the friction pads and to suppress chattering noises in operating the vehicle.

However, there are problems such that the pad spring is retained on the carrier and slidingly contacts with the caliper and with friction pads, thereby the spring force acting on the caliper and on friction pads will change, particularly when the friction pads have worn, and that the assembling operation is troublesome and time consuming.

SUMMARY OF THE INVENTION

An object of the present invention is to solve the problems aforementioned by forming the pad spring of a rod member which is interposed between the caliper and friction pads and is retained on the caliper.

According to one feature of the present invention the pad act to suspend the friction pads from the caliper when the caliper has been disassembled from the carrier. The pad spring, the caliper and the friction pads constitute a sub-assembly, thus, assembling and disassembling operations can be simplified.

According to another feature of the invention, the pad spring is formed of two separate rod members which are connected with each other by connecting members.

Further objects and advantages of the present invention will become apparent from the following descriptions and the attached drawings illustrating some preferred embodiments of the present invention.

BRIEF DESCRIPTION OF THE DRAWINGS

In the drawings:

FIG. 12 is a plan view similar to FIG. 1 but showing a fifth embodiment of the invention;

FIG. 13 is a view as viewed along line XIII—XIII in FIG. 12;

DESCRIPTION OF THE PREFERRED EMBODIMENTS

Figure 1:
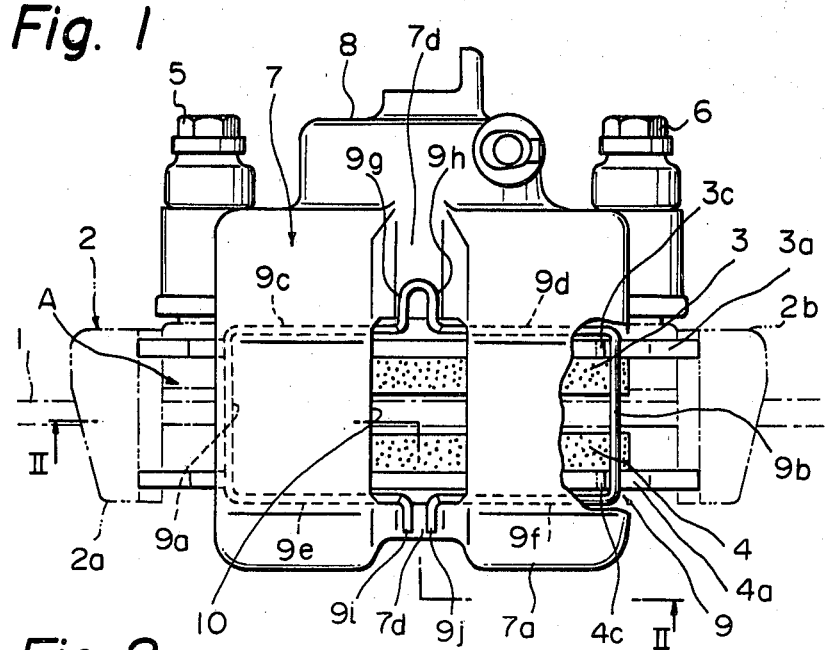
FIG. 1 is a partially broken plan view of a disc brake according to the invention.

In the first embodiment shown in FIGS. 1-4, a carrier 2 is adapted to be connected to a non-rotatable part of a vehicle at one side (the upper side as seen in FIG. 1) of a rotatable disc 1, and has two circumferentially spaced arm portions 2a and 2b which extend respectively in the direction of the axis of the disc 1 and straddle respectively the outer circumference of the disc 1. The arm portions 2a and 2b define therebetween a friction pad receiving space A. A pair of friction pads 3 and 4 having respectively backing plates 3a and 4a are received in the space A and supported on radially outwardly facing shoulders formed on the arm portions 2a and 2b to slide in the direction of the axis of the disc 1. The arm portions 2a and 2b of the carrier 2 receive directly the braking torque generating in the friction pads 3 and 4 in applying the brake.

Figure 22:
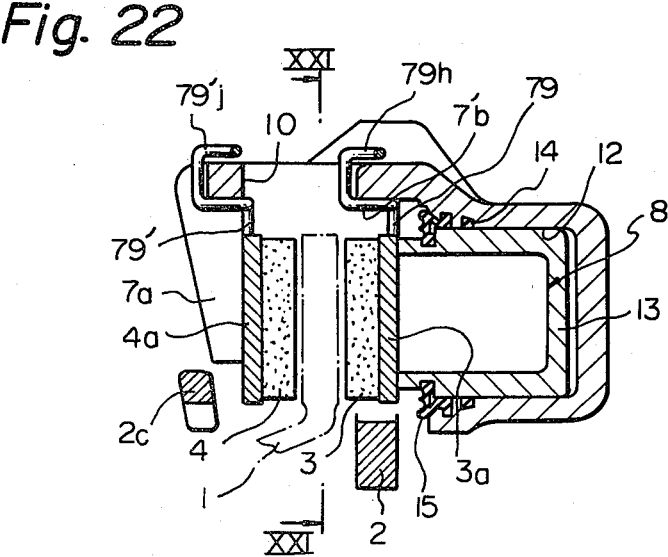
FIG. 22 is a sectional view taken along line XXII—XXII in FIG. 21.

A caliper 7 is slidably mounted on the carrier 2 through a pair of guide pins 5 and 6. The caliper 7 straddles the outer circumference of the disc 1 and, for the end, includes a limb portion 7a located on the rear side of the friction pad 4, and a bridge portion 7b radially outwards of the circumference of the disc 1. A brake actuator 8 (such as shown in FIG. 22) is incorporated in the order limb portion of the caliper 7 to act on the friction pad 3. When a brake pedal (not shown) is depressed, oil under pressure is supplied to the brake actuator 8 to apply the friction pad 3 against one surface of the disc 1, and the reaction force thereof displaces the caliper 7 along the guide pins 5 and 6 in the upward direction as viewed in FIG. 1 whereby the limb portion 7a acts on the friction pad 4 to apply the same against the other surface of the disc 1.

Figure 3:
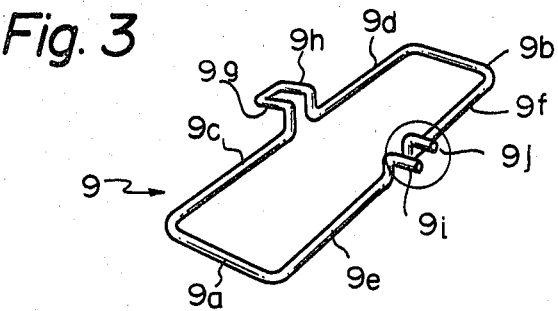
FIG. 3 is a perspective view of the pad spring of FIG. 1.

According to the invention, a pad spring 9 is interposed between the caliper 7 and the friction pads 3 and 4. The pad spring 9 is formed of a rod member such as a resilient steel wire rod to have the configuration as shown in FIG. 3 by means of the bending process. The pad spring 9 has generally the form of a rectangle and comprises friction pad engaging portions 9a and 9b to engage with the upper surfaces of backing plates 3a and 4a of the friction pads 3 and 4 to constitute two opposite sides of the rectangle, arm portions 9c, 9d, 9e and 9f constituting another two opposite sides of the rectangle, and retaining portions 9g, 9h, 9i and 9j positioned on the central portion of the second mentioned two opposite sides of the rectangle. The retaining portions 9g and 9h are formed of the central portion of the original wire rod and have a generally U-shape, and the retaining portions 9i and 9j are separated.

Figure 2:
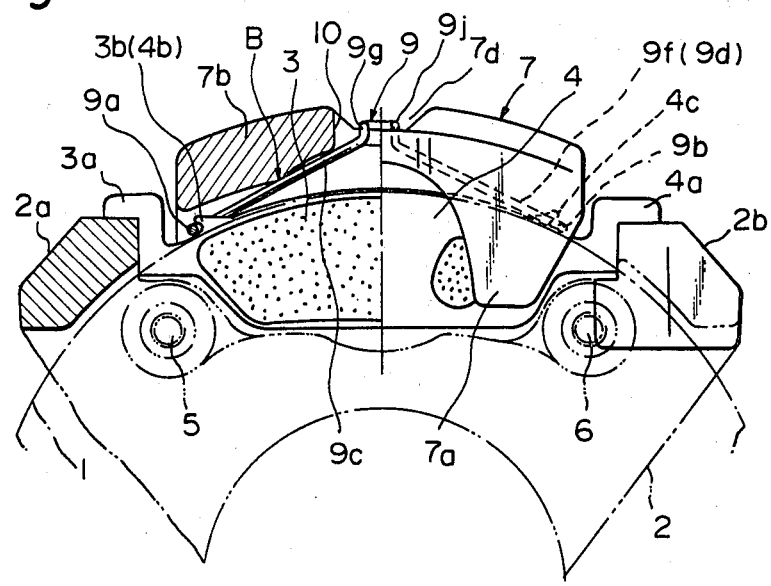
FIG. 2 is a half sectional side view as viewed along line II—II in FIG. 1.

The retaining portions 9g–9j extend through an opening 10 of the bridge portion 7b of the caliper 7 and engage with the outer surfaces of the bridge portion 7b. The friction pad engaging portions 9a and 9b resiliently engage with the backing plates 3a and 4a of the friction pads 3 and 4. Further, the arm portions 9c–9f engage with the inner surface of the bridge portion 7b as shown in FIG. 2. Preferably, axially extending projections or ridges B are formed on the inner surface of the bridge portion 7b of the caliper 7 as shown in FIG. 2 so as to contact with the pad spring 9 and to receive the resilient force therefrom. There are provided axially extending recesses 7d in the upper surface of the bridge portion 7b of the caliper so as to locate the pad spring 9 in the circumferential direction or in the horizontal direction as viewed in FIGS. 1 and 2.

Figure 4:
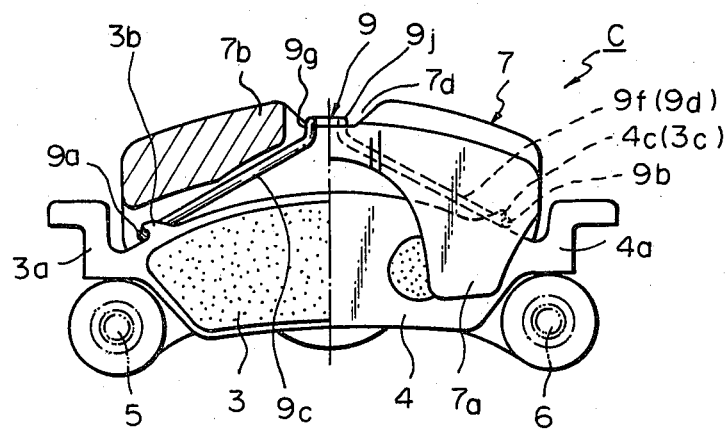
FIG. 4 is half sectional side view similar to FIG. 2, but showing a sub-assembly consisting of the caliper, friction pads and the pad spring of FIG. 1.

According to another feature of the invention there are provided on respective upper surfaces of the backing plates 3a and 4a of the friction pads 3 and 4 circumferentially spaced hook portions 3b and 3c, and 4b and 4c which open respectively in the circumferentially outward directions. The hook portions 3b and 4b are adapted to engage with the engaging portion 9a of the pad spring 9 and the hook portions 3c and 4c are adapted to engage with the engaging portion 9b of the pad spring 9, when the caliper 7 has been disassembled from the carrier 2 as shown in FIG. 4, whereby the friction pads 3 and 4 are suspended from the caliper 7 through the pad spring 9. The caliper 7, the pad spring 9 and the friction pads 3 and 4 constitute a sub-assembly C, thus, the assembling or disassembling operations can be performed very easily and simply. At that condition, the arm portions 9c–9e of the pad spring do not contact with the inner surface of the bridge portion 7b.

The arrangement is particularly advantageous to disc brakes of as-called direct mounting type wherein the carrier 2 is integrally formed on the non-rotatable part of the vehicle. In assembling the disc brake, the subassembly C is mounted on the carrier 2 with the friction pads 3 and 4 being located on the opposite sides of the disc 1 and, thereafter, the guide pins 5 and 6 are screwed into threaded holes formed in the carrier 2. The engaging portions 9a and 9b of the pad spring 9 separate automatically from the hook portions 3b, 3c, 4b and 4c of the friction pads 3 and 4, and the pad spring 9 takes a proper position between the caliper and the friction pads as shown in FIG. 2.

Figure 5:
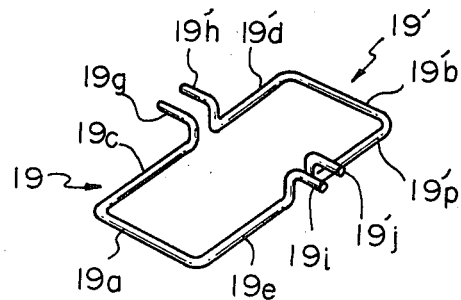
FIG. 5 is a perspective view of the pad spring of a second embodiment of the present invention.

The second embodiment shown in FIG. 5 is generally similar to the first embodiment. The pad spring of the second embodiment consists of two separate rod members 19 and 19', however, the general configuration, arrangement, the function and the operational characteristics are similar to the first embodiment. It will be noted that disc brakes shown in the drawings are generally similar, and the same or the corresponding numerals have been applied to corresponding parts of portions, and detailed descriptions therefor are omitted.

Figure 6:
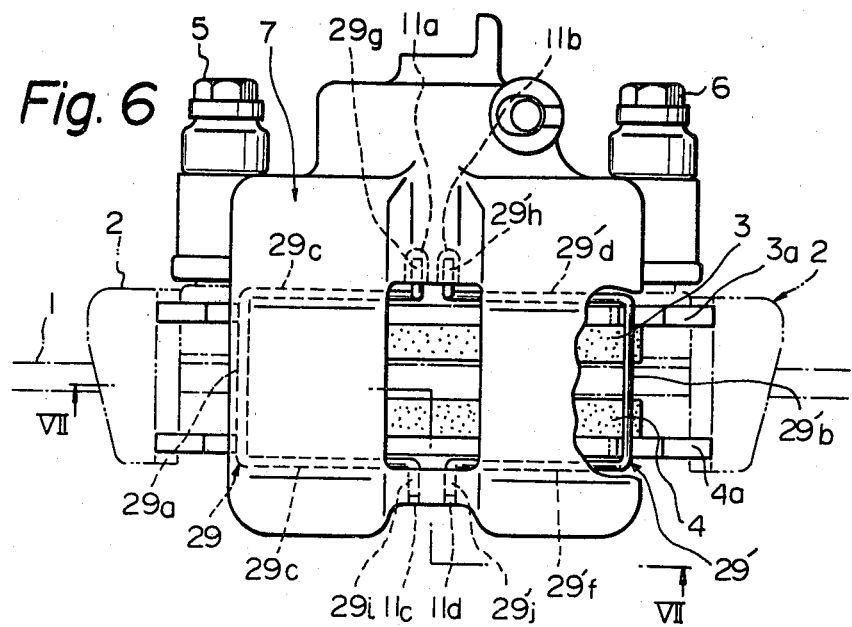
FIG. 6 is a plan view similar to FIG. 1 but showing a third embodiment of the invention.
Figure 7:
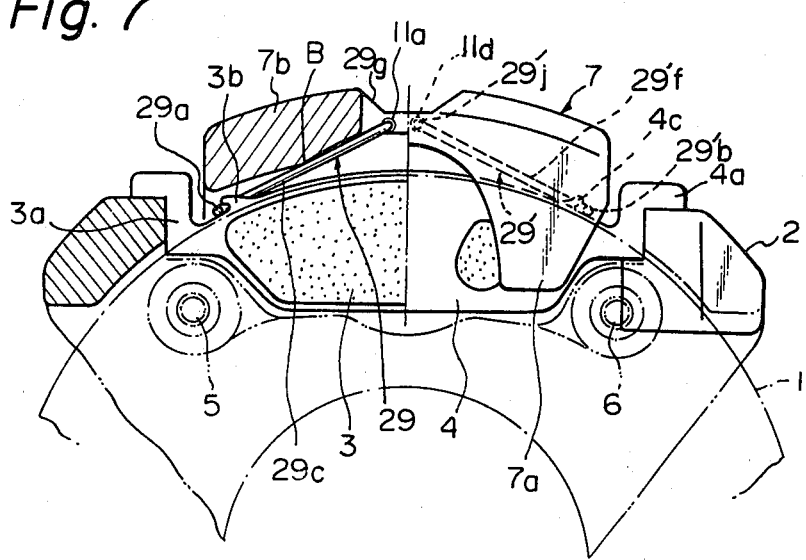
FIG. 7 is a side view as viewed along line VII—VII in FIG. 6.
Figure 8:
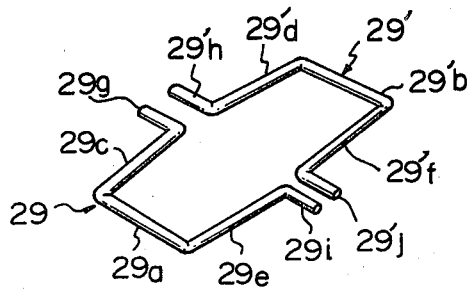
FIG. 8 is a perspective view of the pad spring of FIG. 6.

FIGS. 6–8 illustrate the third embodiment of the invention. The pad spring of the third embodiments is, similarly to that of the second embodiment, formed of two separated rod members 29 and 29', however, the retaining portions 29g, 29i, 29'h and 29'j of the pad springs 29, 29' are located on the plane defined by remaining portions 29a, 29c and 29e, and 29'b, 29'd and 29'f. The retaining portions 29g, 29'h, 29i and 29'j are respectively inserted into recesses 11a, 11b, 11c and 11d which are formed in the axial edges of the opening 10 of the bridge portion 7b, and are retained thereby.

Figure 9:
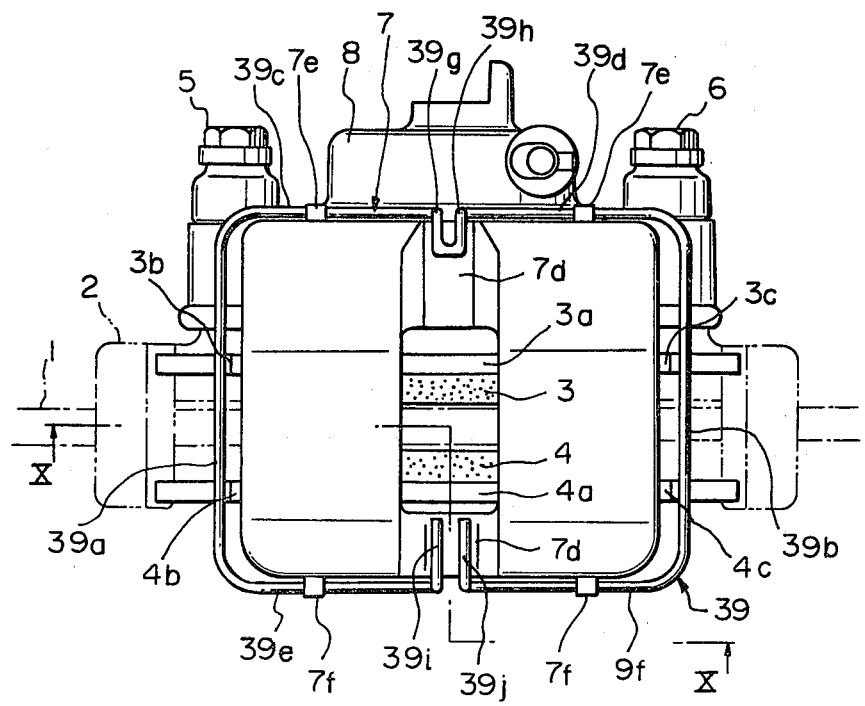
FIG. 9 is a plan view similar to FIG. 1 but showing a fourth embodiment of the invention.
Figure 10:
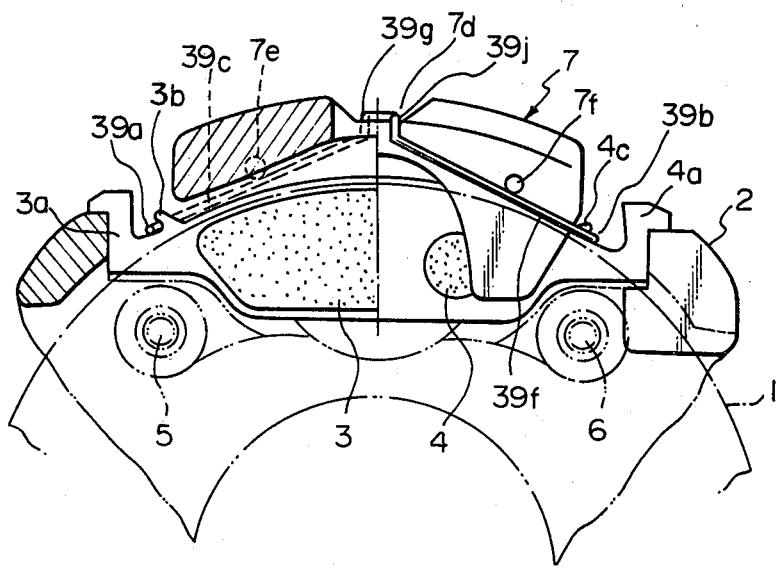
FIG. 10 is a view as viewed along line X—X in FIG. 9.
Figure 11:
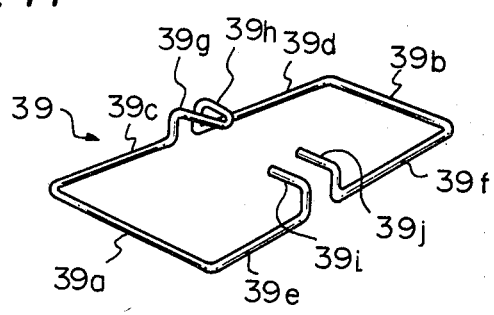
FIG. 11 is a perspective view of the pad spring of FIG. 9.

The pad spring 39 of the fourth embodiment illustrated in FIGS. 9–11 is generally similar to the pad spring 9 in the first embodiment, but the pad spring is denoted by the numeral 39 and encircles the outer circumference of the caliper 7 with retaining portions 39g–39j of the pad spring 39 being hung on the upper surface of the caliper 7. There are provided projections 7e and 7f on the outer circumference of the caliper 7 to engage with the arm portions 39c–39f to receive the resilient force of the pad spring 39.

Figures 12, 13:
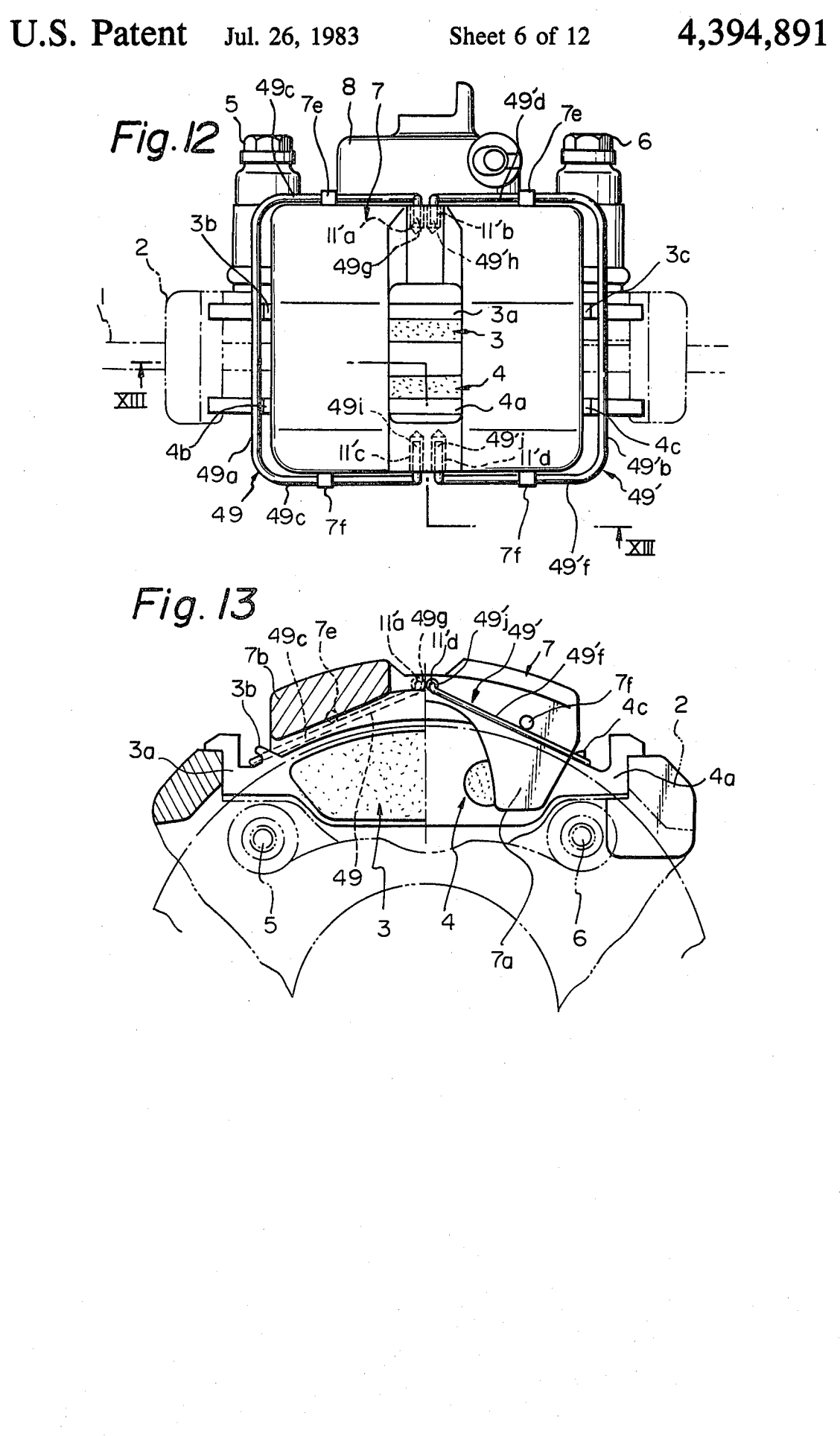
Figure 14:
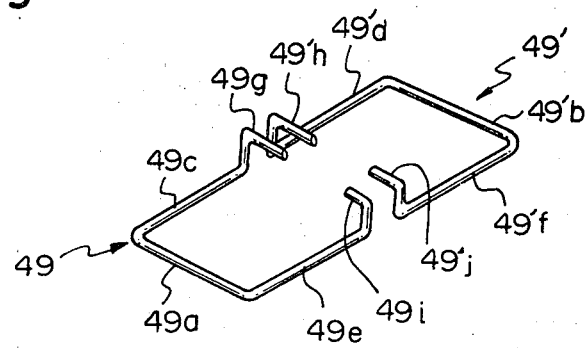
FIG. 14 is a perspective view of the pad spring of FIG. 12.
Figure 15:
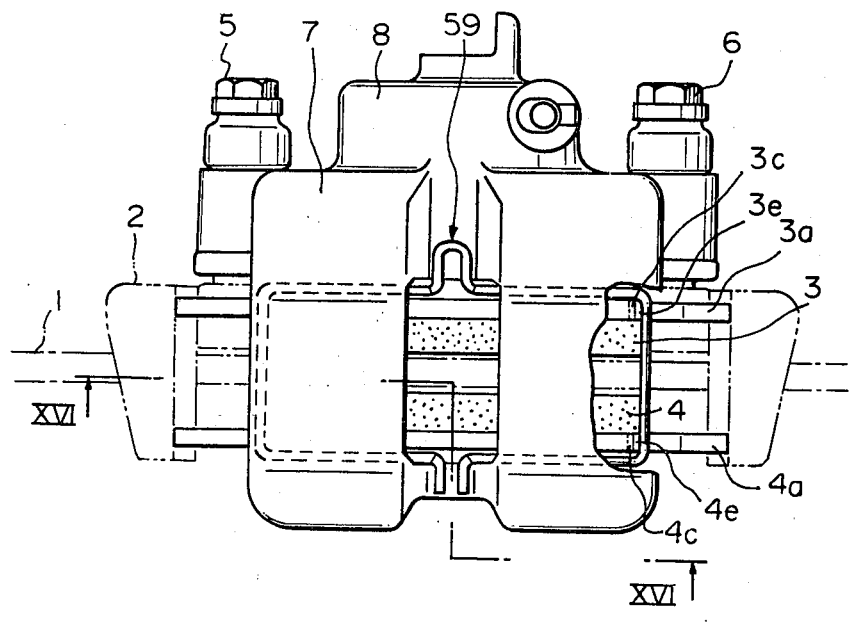
FIG. 15 is a plan view similar to FIG. 1 but showing a sixth embodiment of the invention.
Figure 16:
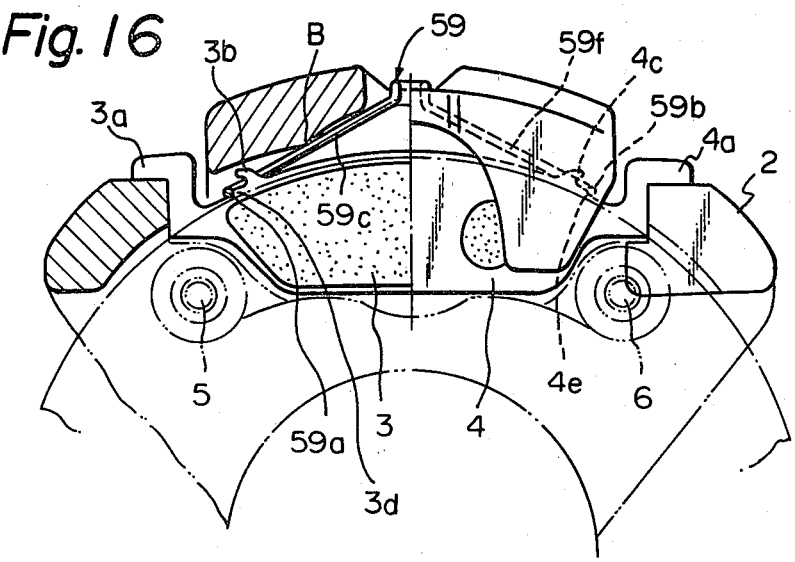
FIG. 16 is a view as viewed along line XVI—XVI in FIG. 15.
Figure 17:
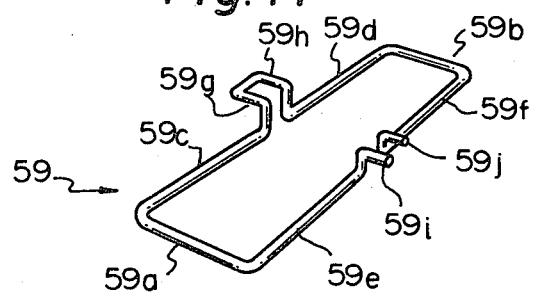
FIG. 17 is a perspective view of the pad spring of FIG. 15.
Figure 18:
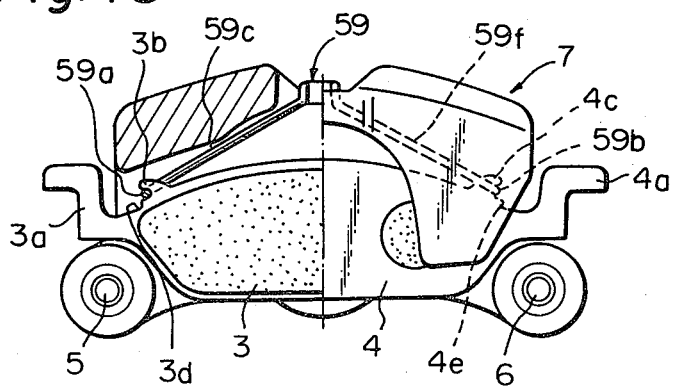
FIG. 18 is a half sectional side view showing a subassembly according to the sixth embodiment of the invention.

The pad spring of the fifth embodiment of the invention illustrated in FIGS. 12–14 consists, similar to the third embodiment, of two rod members 49 and 49' with retaining portions 49g, 49'h, 49i and 49'j being inserted respectively into recesses 11'a–11'd of the caliper 7. In other respects, the pad spring (49 and 49') is generally similar to the pad spring 39.

FIGS. 15–18 illustrate the sixth embodiment of the invention, wherein the pad spring is denoted by the numeral 59 which is generally similar to the pad spring 9 of the first embodiment. The friction pad 3 and 4 are modified to have recessed portions 3d, 3e, 4d and 4e in the upper surface of the backing plates 3a and 4a respectively. The recessed portions 3d, 3e, 4d and 4e are respectively spaced from the hook portions 3b, 3c, 4d and 4c in the circumferentially outward directions. In the normal operating condition shown in FIG. 16, the engaging portions 59a and 59b of the pad spring 59 engage respectively with the recessed portions 3d and 4d and with the recessed portions 3e and 4e so that the displacement of the friction pads in the circumferential directions can be controlled.

Figure 19:
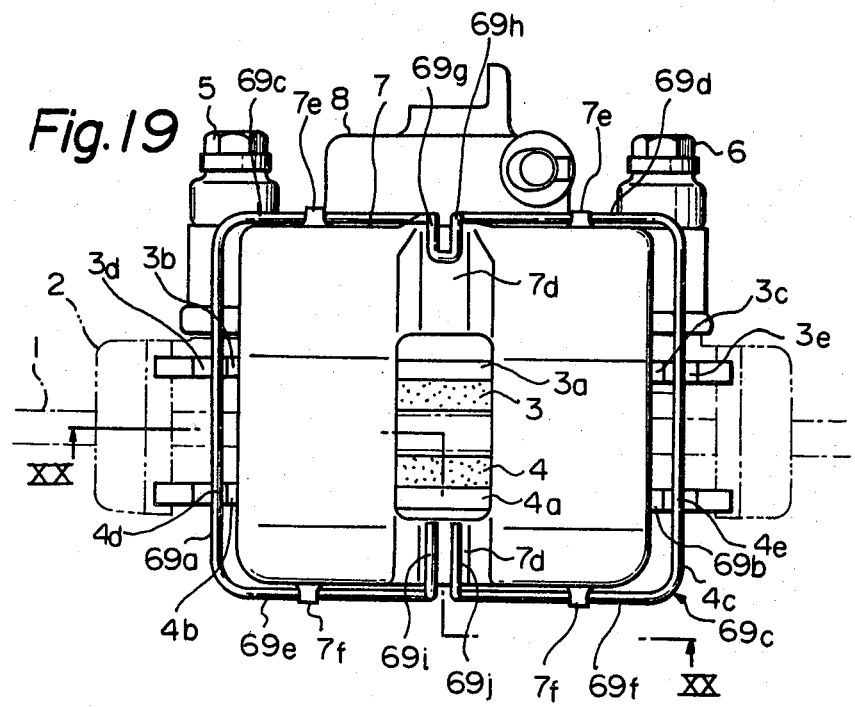
FIG. 19 is a plan view similar to FIG. 1 but showing a seventh embodiment of the invention.
Figure 20:
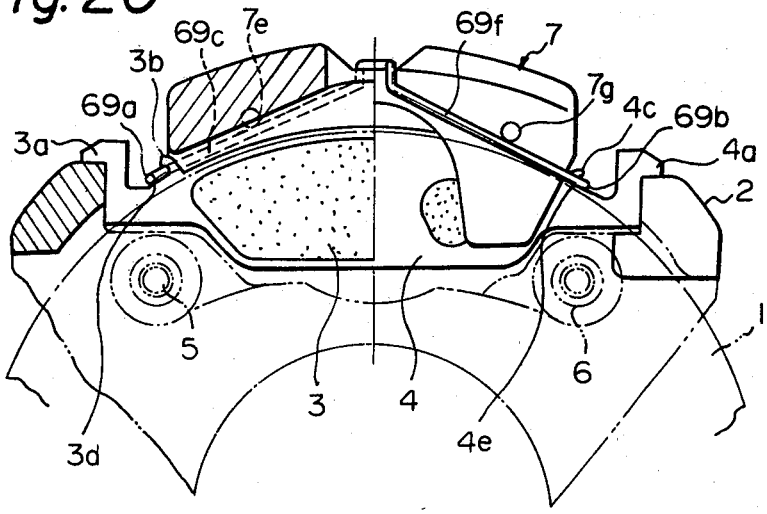
FIG. 20 is a view as viewed along line XX—XX in FIG. 19.

FIGS. 19 and 20 illustrates the seventh embodiment of the invention. The pad spring is similar to the pad spring 39 in the fourth embodiment shown in FIG. 11 and is denoted by the numeral 69. The friction pads 3 and 4 are similar to the friction pads of the sixth embodiment.

According to still further feature of the present invention the pad spring is formed by bending two rod members, and connecting respective adjacent free ends of the rod members by connecting members respectively. Similar to the embodiments shown in FIGS. 5, 8 and 14, it is possible to simplify the manufacturing process and to reduce costs by forming the pad spring of two rod members, however, it is rather difficult to equalize the spring force between two separate pad springs. Such shortcomings can be avoided by connecting the free ends of the rod members with one another to form an integrally connected pad spring.

Preferably, the free ends of the rod members are connected by means of sleeve-like members.

Figure 21:
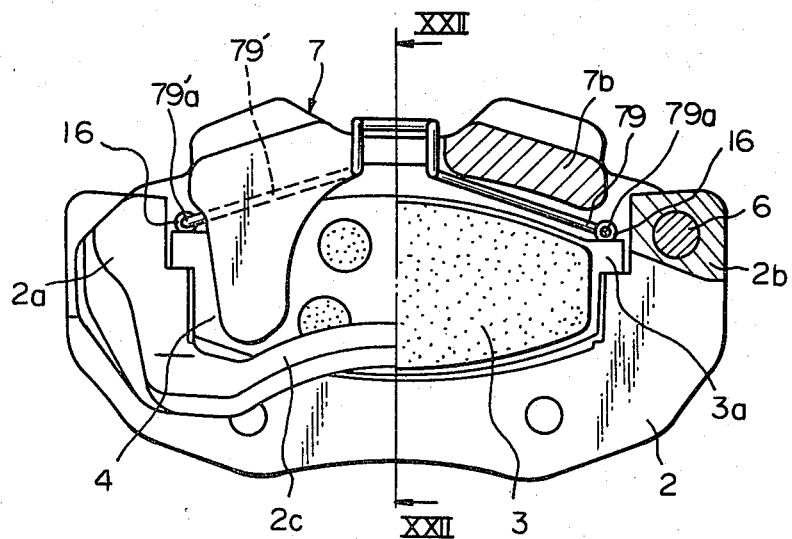
FIG. 21 is a half sectional side view of an eighth embodiment of the invention with the right half thereof being a section taken along line XXI—XXI in FIG. 22.
Figure 23:
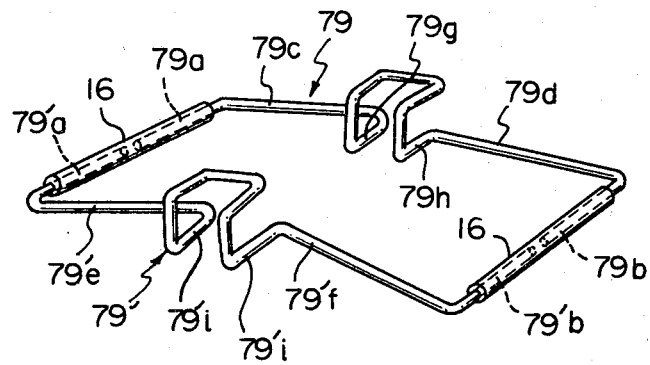
FIG. 23 is a perspective view of the pad spring of FIG. 21.

FIGS. 21-23 illustrate the eighth embodiment of the invention. The pad spring consists, as clearly shown in FIG. 23, of two rod members 79 and 79' which are bent into similar configurations. The free end portions 79a and 79b of the rod member 79 are respectively connected to the free end portions 79'a and 79'b of the rod member 79' through connecting sleeves 16. The connecting sleeves 16 are preferably metal tubes with the inner diameter of which being adapted to forcibly receive the end portions of the pad spring. However, the end portions of the pad spring may be connected by any other suitable connecting members, and may be secured to the connecting members utilizing suitable technique such as caulking, soldering or bonding.

The pad spring 79, 79' acts on friction pads 3 and 4 through connecting sleeves 16, thus, it is possible to equalize the spring force acting on the friction pads 3 and 4 irrespective to the relative axial displacement of the caliper 7 and the friction pad 3. In the normal operating condition, horizontally extending retaining portions 79g, 79h, 79'i and 79'j of the pad spring engage with the inner surface of the caliper 7 to transmit the spring force to the caliper 7.

Further, FIG. 22 illustrates a typical construction of the brake actuator 8 which comprises a cylinder bore 12, a piston 13 slidable in the cylinder bore 12, a seal ring 14 provided between the cylinder bore 12 and the piston 13, and a dust boot 15. When oil under pressure is supplied into the cylinder bore 12, the piston 13 displaces leftward thereby pressing the friction pad 3 against the right surface of the disc 1. The reaction force of the brake actuator displaces the caliper 7 in the rightward direction, so that the limb portion 7a presses the backing plate 4a of the friction pad 4 to apply the same against the left surface of the disc. Preferably, the central portions of respective rod members 79 and 79' are bent to have generally horizontal U-shaped configuration as seen in FIG. 22 to clamp therebetween the radially inner and outer surfaces of the caliper 7, and the resilient force of the pad spring is transmitted to the inner surface of the caliper through retaining portions 79g, 79'h, 79i and 79'j of the pad spring.

Shown at 2c in FIGS. 21 and 22 is a reinforcing beam integrally connecting the arm portions 2a and 2b of the carrier 7.

Figure 24:
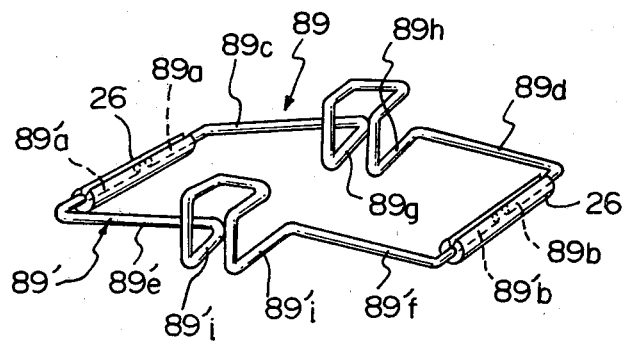
FIG. 24 is a perspective view of the pad spring of a ninth embodiment of the invention.

FIG. 24 shows a modified form, wherein end portions 89a and 89b of a rod member 89 are connected respectively with end portions 89'a and 89'b of a rod member 89' through connecting members 26 which are formed by curling plate-like members around the end portions of the rod members.

Figure 25:
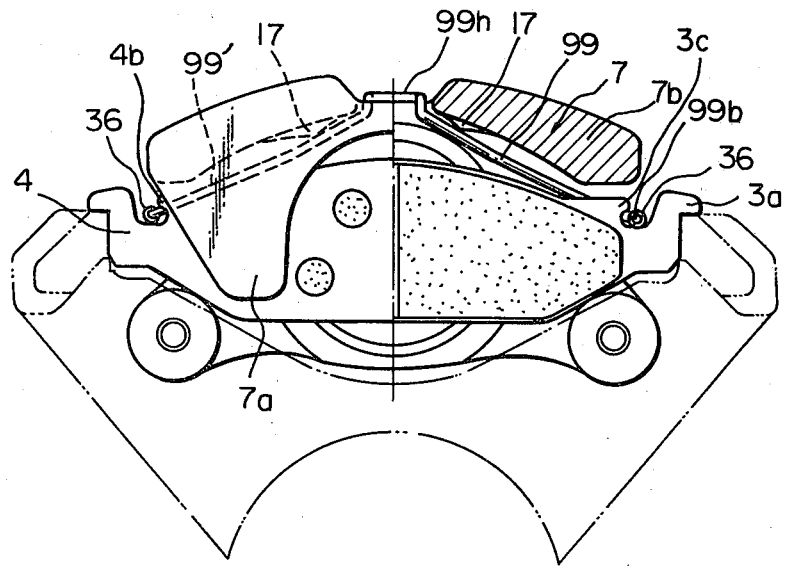
FIG. 25 is a half sectional side view similar to FIG. 2 but showing a tenth embodiment of the invention.
Figure 26:
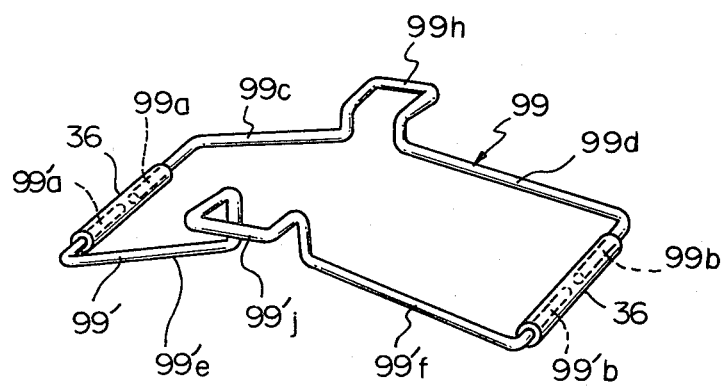
FIG. 26 is a perspective view of the pad spring of FIG. 25.

FIGS. 25 and 26 show still further embodiment of the invention which is a combination of the first and eighth embodiments (FIGS. 2 and 3 and FIGS. 21 and 23). The pad spring engages with the upper surface of the bridge portion 7b of the caliper 7 and with projections or ridges 17 formed on the lower surface of the caliper 7 as similar to the first embodiment, and connecting sleeves 36 of the pad spring engages with the friction pads 3 and 4. Further, there are provided hook portions on the backing plates 3a and 4a of the friction pads 3 and 4 to engage with the connecting sleeves 36 when the caliper 7 and the friction pads 3 and 4 have been disassembled from the carrier 2.

As described heretofore, the disc brake according to the invention comprises a pad spring formed of a rod member and is retained on the caliper to act between the caliper and a pair of friction pads. The pad spring is not mounted on the carrier and acts on the carrier through friction pads. Thus, the assembling and disassembling operations can be performed very easily, and the fabricating cost of the pad spring can be reduced.

What is claimed is:

1. A disc brake comprising a carrier adapted to be secured to a non-rotatable part of a vehicle and having two circumferentially spaced arm portions which straddle respectively the outer circumference of a rotatable disc, a pair of friction pads positioned on backing plates supported on said arm portions of the carrier to slide in the direction of the axis of the disc, a caliper mounted on the carrier to slide in the direction of the axis of the disc, said caliper including a brake actuator for applying one friction pad against one surface of the disc, said caliper having a limb portion straddling the outer circumference of the disc and engaging with the other friction pad to apply the same against the other surface of the disc, and a pad spring formed of a rod member and being retained on the caliper to bias the friction pads in the radially inward direction with respect to the disc, said backing plates having hook portions formed thereon which engage with the pad spring to retain and suspend the pad backing plates when the caliper has been disassembled from the carrier.

2. A disc brake as set forth in claim 1 wherein a recessed portion is formed in each of the backing plates and circumferentially outwards of each hook portion to normally engage with the pad spring thereby locating the pad spring with respect to the friction pads.

3. A disc brake as set forth in claim 1 wherein the pad spring consists of two rod members provided respectively between the caliper and respective friction pads, with adjacent free ends of respective rod member being connected with one another by connecting members.

4. A disc brake as set forth in claim 3 wherein the connecting members are sleeve-like member through which the rod members act on the friction pads.

* * * * *